(12) United States Patent
Park et al.

(10) Patent No.: US 6,470,030 B1
(45) Date of Patent: Oct. 22, 2002

(54) ORTHOGONAL FREQUENCY DIVISION MULTIPLEXING RECEIVER SYSTEM

(75) Inventors: Jae Hyeok Park, Incheon; Yeong Sang Kim, Seoul, both of (KR); Jean Jacques Michel, Thionville (FR); Francois Langinieux; Olivier Dejonghe, both of Metz (FR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/261,508

(22) Filed: Mar. 3, 1999

(30) Foreign Application Priority Data

Apr. 28, 1998 (KR) .............................................. 98-15187

(51) Int. Cl.[7] .......................... H04J 11/00; H04J 1/00; H04L 27/22
(52) U.S. Cl. ...................... 370/480; 370/230; 375/316
(58) Field of Search ............................... 370/203, 206, 370/208, 210, 211, 319, 329, 330, 343, 344, 480, 482; 375/260, 316

(56) References Cited

U.S. PATENT DOCUMENTS

| 5,550,812 | A | * | 8/1996 | Philips ........................ 370/203 |
| 5,682,376 | A | * | 10/1997 | Hayashino et al. ......... 370/206 |
| 5,914,932 | A | * | 6/1999 | Suzuki et al. ................ 370/203 |
| 5,959,965 | A | * | 9/1999 | Ohkubo et al. ............. 370/203 |
| 6,198,781 | B1 | * | 3/2001 | Ohno et al. .................. 370/203 |
| 6,201,785 | B1 | * | 3/2001 | Fouche et al. ............... 370/203 |
| 6,359,938 | B1 | * | 3/2002 | Keevill et al. ............... 370/206 |
| 6,363,084 | B1 | * | 3/2002 | Dejonghe ................... 370/480 |

\* cited by examiner

*Primary Examiner*—Hassan Kizou
*Assistant Examiner*—David Odland
(74) *Attorney, Agent, or Firm*—Pillsbury Winthrop, LLP

(57) ABSTRACT

An OFDM receiver system for performing precise OFDM demodulation is provided. The OFDM receiver system performs demodulation by sharing memories and operators in a time-divisional manner. FFT-processed data is separated into specific pilot signals and data according to the timing indicated by a controller to then be rearranged and stored, thereby facilitating extraction of corresponding pilot signals and data for various synchronization and equalization steps. Therefore, the demodulation system having an optimal structure can be realized in view of resource utilization efficiency and chip areas, the cost and time for fabricating and designing the system can be reduced, and verification of the system can be easily performed.

20 Claims, 13 Drawing Sheets

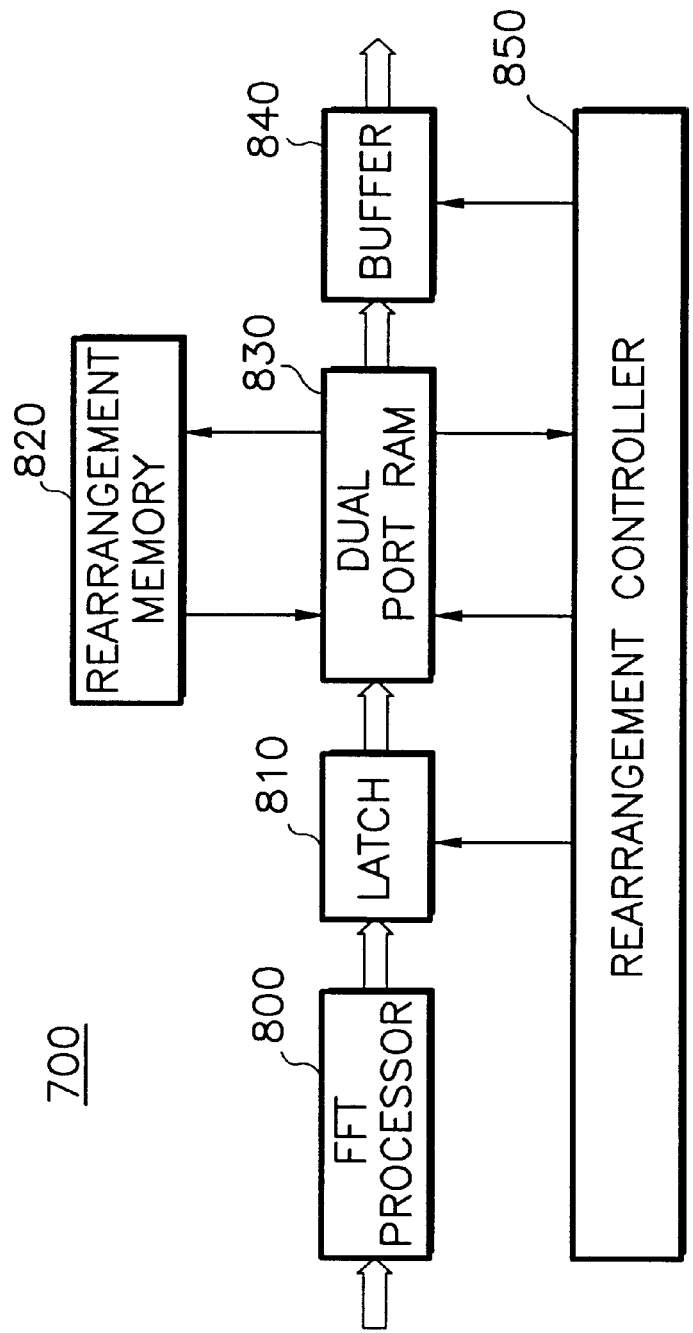

ORTHOGONAL FREQUENCY DIVISION MULTIPLEXING RECEIVER SYSTEM

BACKGROUND OF THE INVENTION

1. Field of the Invention

The present invention relates to an orthogonal frequency division multiplexing (OFDM) receiver system, and more particularly to an OFDM receiver system for performing demodulating operation after storing FFT-processed OFDM signals according to a predetermined rearrangement rule and extracting specific pilot signals.

2. Description of the Related Art

In an OFDM method, serially-inputted symbol streams are divided into unit blocks. The symbol streams of each unit block are converted into N number of parallel symbols. After the conversion, these symbols are multiplexed and added by using a plurality of subcarriers having different frequencies, respectively, according to Inverse Fast Fourier Transform (IFFT) algorithm and transmitted via the channel. That is, the N number of parallel symbols are defined as one unit block, and each subcarrier of the unit block has an orthogonal characteristic, which does not have an influence on subchannels. Consequently, in the OFDM method, the Inter-Symbol Interference (ISI) caused by multi-path fading can be reduced by increasing symbol period in proportion to the number of subchannels (N) while maintaining the same symbol transmission rate as that of a single carrier transmission method. Especially, a guard interval is inserted between the transmitted symbols to enhance the capability of the ISI reduction. As a result, a channel equalizer of simplified structure can be implemented.

In the above OFDM method, according to the Digital Video Broadcasting (DVB) standards, a transmission signal comprises frames, and each frame has a period of $T_F$ and 68 OFDM symbols. A superframe comprises four frames. Each symbol is formed by 6817 carriers in the case of an 8K mode and 1705 carriers in the case of a 2K mode (where K is the number of carriers), and has a symbol period of $T_s$.

In addition to the transmitted data, the OFDM transmission frame includes scattered pilot cells (SPC), continual pilot carriers (CPC), transmission parameter signaling pilots (TPS), etc. These pilot signals are used for frame synchronization, frequency synchronization, time synchronization, channel estimation, transmission mode identification or phase noise tracing. The pilot cells used as reference signals during demodulation are transmitted with a boosted power level, that is, about 1.4 times of the data level, and exist at specifically fixed carrier positions. Thus, in a receiver side, compensation of channel distortion generated during transmission and various kinds of synchronization can be performed using the carrier positions of the pilot cells and the information on the power level during transmission.

In general, an OFDM demodulation procedure includes an FFT step, a synchronizing step, an equalizing and deinterleaving step and a forward error correction (FEC) step. The synchronizing step is processed in the order of coarse time synchronization, coarse frequency synchronization, frame synchronization, fine frequency synchronization and fine time synchronization. Then, phase noise estimation and correction are performed and then symbol equalization is performed. Finally, the equalized symbols are demapped and deinterleaved.

However, conventional OFDM receiver systems require a considerable memory capacity for various kinds of synchronization, such as time synchronization, frequency synchronization or frame synchronization. Also, implementation of components for performing the same functions, for example, operators for complex number multiplication or pilot extraction, is overlapped, resulting in consumption of resources.

SUMMARY OF THE INVENTION

To solve the above problems, it is an object of the present invention to provide an OFDM receiver system having an optimal structure in view of resource utilization efficiency and chip area, by sharing common resources in a time-divisional manner by storing FFT-processed OFDM signals according to a predetermined rearrangement rule and extracting specific pilot signals in sequentially processed synchronization steps.

It is another object of the present invention to provide an OFDM receiver system which can reduce fabrication cost and architecture time and can obtain a reliable verification result.

To achieve the above objects, there is provided an orthogonal frequency division multiplexing (OFDM) receiver system comprising: a receiving section for receiving an OFDM signal, converting the same into a digital signal, and compensating a phase error and a frequency error of the digitally converted OFDM signal; a pilot signal decoding section for FFT-processing the output of the receiving section, and sequentially storing pilot signals and data separately according to a rearrangement rule; a synchronizing section for receiving the output of the pilot signal decoding section, performing coarse time synchronization, coarse frequency synchronization, frame synchronization, fine frequency synchronization and fine time synchronization, estimating a phase noise and correcting the same; an equalizing and deinterleaving section for performing a channel equalization algorithm on the output of the pilot signal decoding section using a reference pilot signal of the synchronizing section, restoring the equalized symbol into the original symbol, and rearranging the symbol in the order of the original symbol; and a controller for controlling the timing of data rearrangement in the pilot signal decoding section and feed-back controlling the receiving section according to the outputs of the respective synchronization results.

BRIEF DESCRIPTION OF THE DRAWINGS

The above object and advantages of the present invention will become more apparent by describing in detail a preferred embodiment thereof with reference to the attached drawings in which:

FIG. 10 is a detailed block diagram of a pilot signal decoding section;

DETAILED DESCRIPTION OF THE PREFERRED EMBODIMENTS

Hereinbelow, a preferred embodiment of the present invention will be described with reference to the accompanying drawings.

The OFDM receiver system of this embodiment devised for the European digital television terrestrial broadcasting complies with the transmission standards stipulated by the DVB.

Figure 1:
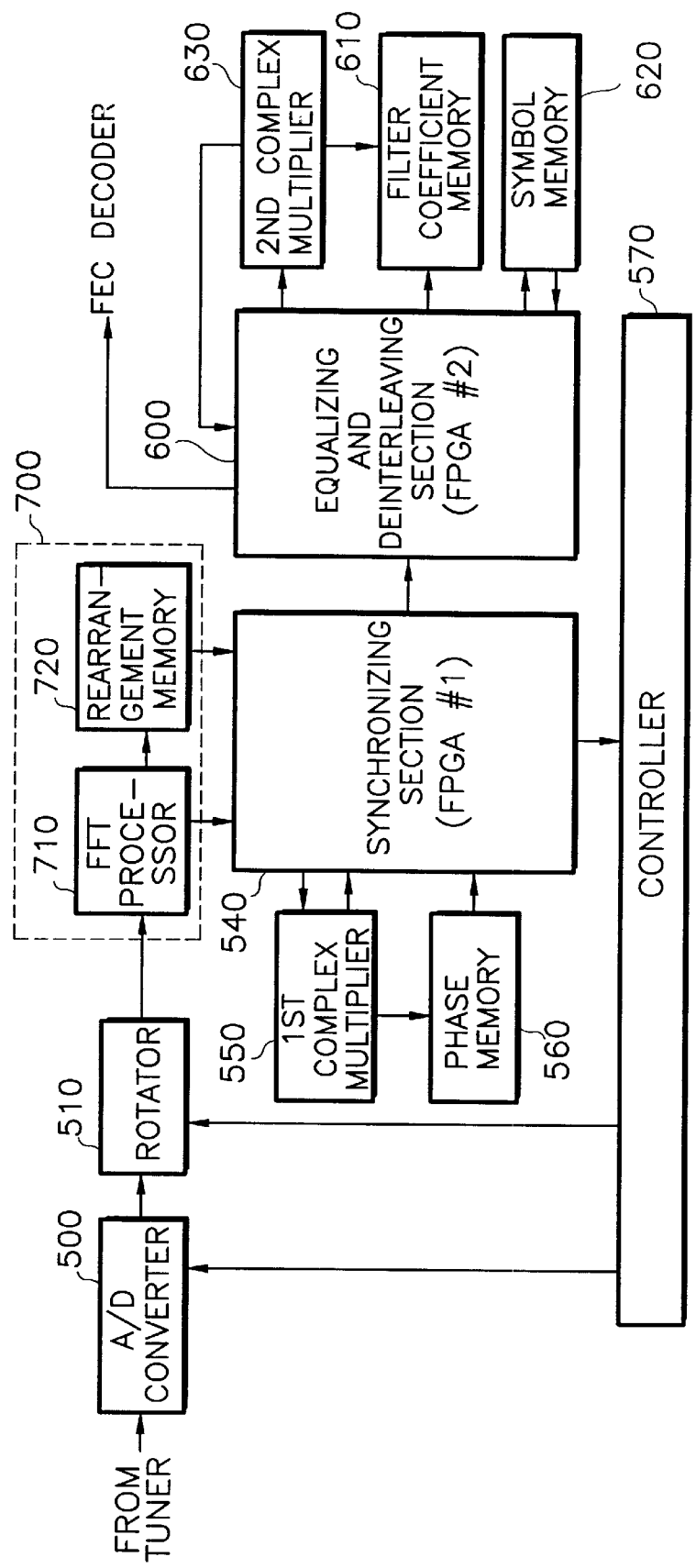
FIG. 1 is a basic structural diagram showing the layout of components of an OFDM receiver system according to the present invention.

FIG. 1 is a basic structural diagram showing the layout of components of an OFDM receiver system according to the present invention. The basic structure of the OFDM receiver system employs a digital signal processing (DSP) chip and a field programmable gate array (FPGA) chip programmed to sequentially perform various kinds of synchronization, equalization, demapping and deinterleaving, and a commonly usable hardware is disposed externally. The external hardware includes a memory device such as SRAM or ROM table, a complex multiplier, a FFT processor or a FEC decoder.

In FIG. 1, the OFDM receiver system includes an A/D converter 500, a rotator 510, an FFT processor 710, a rearrangement memory 720, a synchronizing section 540, a first complex multiplier 550, a phase memory 560, a controller 570, an equalizing and deinterleaving section 600, a filter coefficient memory 610, a symbol memory 620, and a second complex multiplier 630. Here, the FFT processor 710 and the rearrangement memory 720 constitute a pilot signal decoding section 700. The synchronizing section 540 is implemented by a first FPGA chip (FPGA#1), the equalizing and deinterleaving section 600 is implemented by a second FPGA (FPGA#2), and the controller 570 is implemented by a digital signal processor (DSP).

A received OFDM signal is converted by the FFT processor 710 via the A/D converter 500 and the rotator 510 to then be stored in the rearrangement memory 720. The rearrangement memory 720 rearranges data stored in a format suitable for each step of synchronization when the time synchronization, frequency synchronization, frame synchronization, etc. are sequentially performed.

The synchronizing section 540 sequentially performs coarse time synchronization, coarse frequency synchronization, frame synchronization, fine frequency synchronization, fine time synchronization, etc. Also, the synchronizing section 540 estimates a phase error value for phase synchronization. In this case, the synchronizing section 540 receives the output of the rotator 510 and the output of the rearrangement memory 720, and shares the first complex multiplier 550 and the phase memory 560 in a time-divisional manner to perform the corresponding synchronization and phase error estimation, which are entirely controlled by the controller 570.

The equalizing and deinterleaving section 600 sequentially performs equalization, demapping and deinterleaving. The equalizing and deinterleaving section 600 receives reference pilot signals and symbol data obtained by the synchronizing section 540 is performed equalization for compensating for channel-distorted signals using the symbol memory 620, the filter coefficient memory 610 and the second complex multiplier 630. Thereafter, the equalizing and deinterleaving section 600 performs QAM demapping on the equalized symbol to determine the original symbol and then performs symbol deinterleaving to obtain the original bitstream to then be supplied to an external FEC decoder.

Now, the synchronization and equalization of the present invention will be described in detail with reference to the accompanying drawings. The explanation will be made in the order of processed steps.

Figure 2:
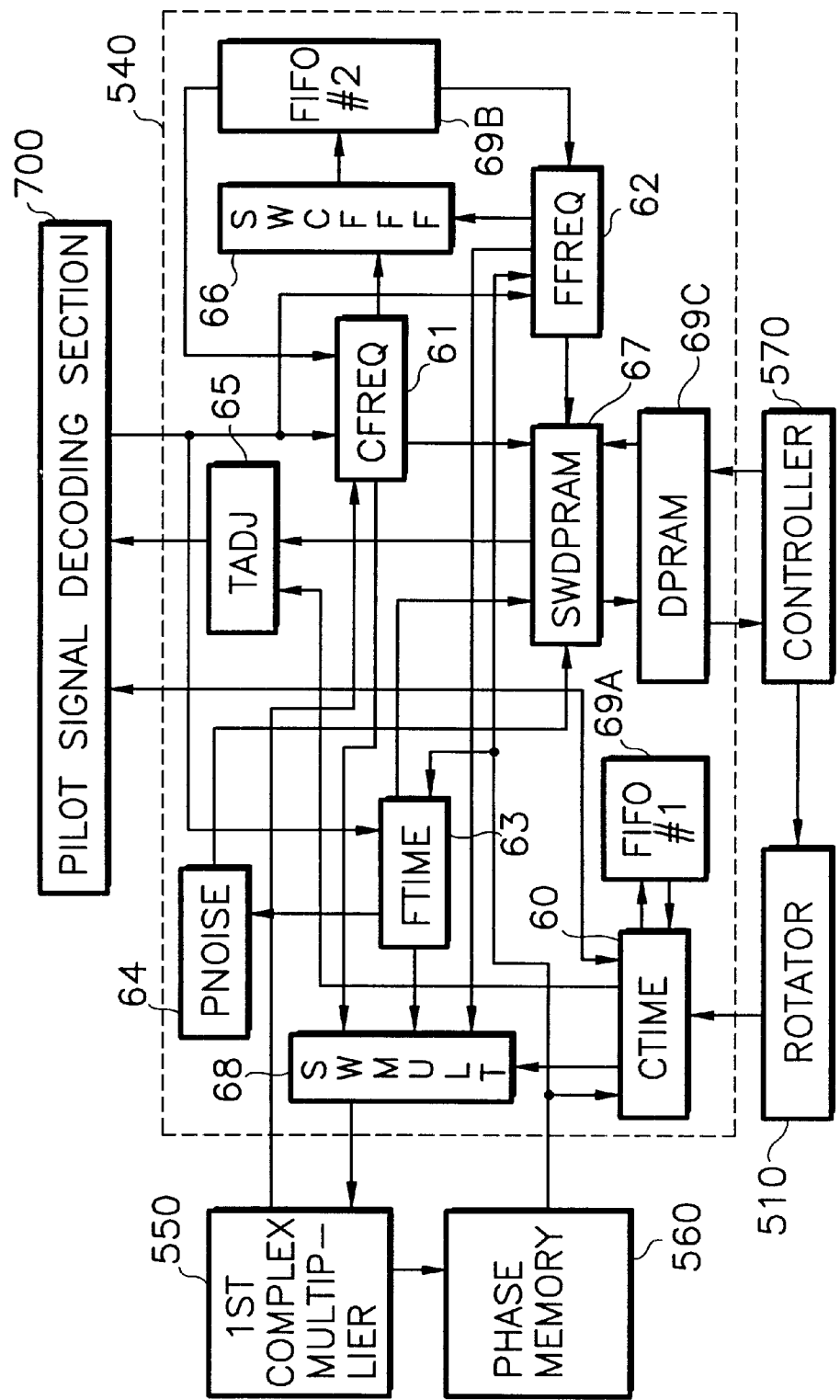
FIG. 2 illustrates various functional blocks of a synchronizing section shown in FIG.1.

FIG. 2 shows the overall structural diagram of the synchronizing section 540 implemented by an FPGA. Referring to FIG. 2, various functional blocks of the synchronizing section 540, the input/output routing relationship among the respective functional blocks and data flow from/to external blocks will be described briefly. The FPGA consists of basic cells for implementing arbitrary logic functions of the respective synchronization algorithms, and a routing area among these cells, and will be explained in two parts; a logic circuit block and an interfacing block.

① Logic circuit block

A coarse time synchronization block (CTIME) 60 calculates an estimated value $^{\epsilon}$CTIME for coarse time synchronization. A coarse frequency synchronization block (CFREQ) 61 calculates an estimated value $\epsilon_{CFREQ}$ for coarse frequency synchronization. A fine frequency synchronization block (FFREQ) 62 calculates an estimated value $\epsilon_{FFREQ}$ for fine frequency synchronization. A fine time synchronization block (FTIME) 63 calculates an estimated value $\epsilon_{FTIME}$ for fine time synchronization. A phase noise estimation block (PNOISE) 64 calculates an estimated value $\epsilon_{PNOISE}$ for phase noise estimation and correction.

② Interfacing block

A first memory (FIFO#1) 69A is a first-in-first-out buffer for temporarily storing data input from and/or output to the CTIME 60. A second memory (FIFO#2) 69B is a first-in-first-out buffer for temporarily storing data input from and/or output to the CFREQ 61 and the FFREQ 62. A third memory (DPRAM) 69C is a dual-port RAM for storing data input from and/or output to the CFREQ 61, the FFREQ 62, the FTIME 63 and the PNOISE 64 through a second switching block (SWDPRAM) 67 to be described later, and for storing data input from and/or output to the controller 570. A timing adjusting block (TADJ) 65 transmits a control signal indicative of the starting timing of a time domain symbol to the pilot signal decoding section 700 according to signals supplied from the CTIME 60 and the SWDPRAM 67. A first switching block (SWCFFF) 66 for performing coarse frequency synchronization and fine frequency synchronization serves to perform interfacing with the second memory (FIFO#2) 69B shared by the CFREQ 61 and FFREQ 62 in a time-divisional manner. The second switching block (SWPRAM) 67 serves to perform interfacing with the third memory (DPRAM) 69C shared by the CFREQ 61, the FFREQ 62, the FTIME 63 and the PNOISE 64 in a time-divisional manner. A third switching block (SWMULT) 68 serves to perform interfacing for allowing the CTIME 60, the CFREQ 61, the FFREQ 62 and the FTIME 63 to share the externally disposed first complex multiplier 550 in a time-divisional manner.

An undefined lookup table, that is, phase memory 560 is the same as that of FIG. 1. The pilot signal decoding section 700 performs the functions of the FFT processor 710 and the rearrangement memory 720 shown in FIG. 1 and the structure and operation thereof will be described later in detail.

Now, basic algorithms and operations of various kinds of synchronization will be described in the processing order.

1. Coarse time synchronization

Coarse time synchronization is performed for the first time during a synchronization procedure, for obtaining a reference starting position of an OFDM symbol, that is, the first sample starting with a symbol. An OFDM demodulation signal transmitted through a channel is received in a receiver side and is converted into a down frequency, and then a low-pass filtered analog signal is converted into a digital signal, thereby obtaining complex sample serial streams. Here, the guard interval must be deleted from the complex sample serial streams of the digital signal and only a useful interval must be parallel-processed to be input to the FFT processor 710. Thus, in order to obtain the starting position of the useful interval, that is, the first sample, before performing the FFT operation, the characteristics of the guard interval is utilized. The coarse time synchronization is performed using correlation between samples on a time domain before performing the FFT operation. For example, consideration is taken into the correlation between the useful interval and the guard interval in a sample.

The estimated value $\epsilon_{CTIME}$ ($=\epsilon_i$) evaluated for coarse time synchronization can be expressed as the following equation (1).

$$\varepsilon_i = \sum_{k=0}^{k<(N_u/q)} |(\arg(X_{i+qk}) - \arg(X_{i+q(k-1)})) - (\arg(X^d_{i+qk}) - \arg(X^d_{i+q(k-1)}))| = \sum_{k=0}^{k<(N_u/q)} |A_k - B_k|$$

Equation (1)

where $$A_k = \arg(X_{i+qk}) - \arg(X_{i+q(k-1)}), B_k = \arg(X^d_{i+qk}) - \arg(X^d_{i+q(k-1)})]$$

In the above equation (1), a variable $N_u$ is the total number of useful samples, $N_g$ is the total number of the samples present in the guard interval, $X_i$ is the received complex sample of a time domain, and $X_i^d$ is the received complex sample delayed by the number $N_u$ and equals to $X_{i-NU}$. k is the index for counting the number of $(N_g/q)$ samples, that is, the window size, i is the index indicative of the position of the first sample of a predetermined window, $\epsilon_i$ is the coarse time estimated value calculated in the i-th window, and arg is the argument for the complex sample of the time domain. A variable q takes three constants, that is, 1, 2 and 4, according to OFDM modes. The value of q is fixed due to limitation in using a memory allocated for summation within a window, and may be varied.

Figure 3:
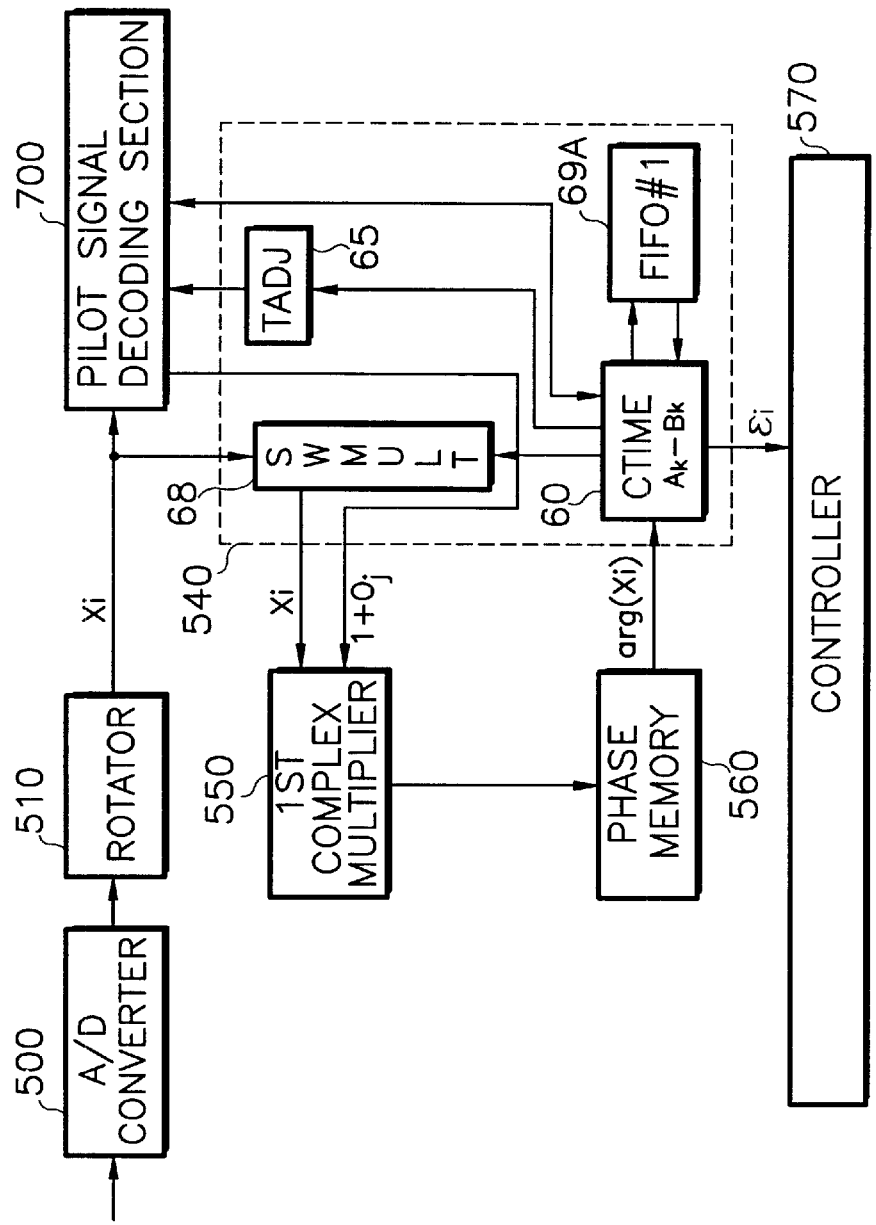
FIG. 3 illustrates input/output data flow among blocks for performing coarse time synchronization in the synchronizing section shown in FIG. 2.

FIG. 3 illustrates input/output data flow among blocks for performing coarse time synchronization by the synchronizing section 540 shown in FIG. 2, in which reference numerals of some functional blocks are the same as those in FIG. 2. The coarse time (CTIME) synchronization is realized by the above equation (1).

The argument is calculated in the first complex multiplier 550 to which a signal output from the rotator 510, that is, the complex number $X_i$ is applied from the SWMULT 68 and 1+Oj is applied from the rearrangement memory 720 of the pilot signal decoding section 700. The result of complex multiplication is output to the phase memory 560. The phase memory 560 outputs a phase function $\arg(X_i)$ for the signal input thereto to the CTIME 60.

$X_i^d$ sample is obtained by delaying $X_i$ sample by $N_u$ samples in the useful interval in a first-in-first-out manner through the rearrangement memory 720 of the pilot signal decoding section 700. In other words, in the CTIME synchronization, data rearrangement by the pilot signal decoding section 700 is not necessary. The rearrangement memory 720 of the pilot signal decoding section 700 is simply used as an FIFO.

The CTIME 60 obtains a difference value $A_k$ between current neighboring samples, and a difference value $B_k$ between the neighboring samples delayed corresponding to the $N_u$ samples through the pilot signal decoding section 700. Also, the difference value $A_k$ between current neighboring samples and the difference value $B_k$ between the neighboring samples delayed corresponding to the $N_u$ samples are subtracted within the range of the window size set by the first memory (FIFO#1) 69A. The subtraction results are accumulated to obtain the sum of the i-th window, that is, the estimated value $\epsilon_{CTIME}$ ($=\epsilon_i$).

The window summation is performed using the first memory (FIFO#1) 69A. In the case of 2 EAB's FIFO, the value $N_g/q$ used for the window summation is determined as follow:

a. Where q=1, all 2K modes irrespective of the size of the guard interval and 8K mode having the size of ⅓₂ that of the guard interval;

b. Where q=2, 8K mode having the size of ⅛ that of the guard interval; and c. Where q=4, 8K mode having the size of ¼ that of the guard interval.

The timing for the coarse time synchronization is controlled by the TADJ 65.

Acquisition of the starting point of a symbol is realized simply by detecting of a threshold value. In other words, the existence ranges of the estimated values are different depending on the cases where ($Xi_{i+k}$, $X_{i+k-1}$) exists within the guard interval and where ($X_{i+k}$, $X_{i+k-1}$) does not exist within the guard interval. When the window exists within the useful interval of the OFDM symbol, the estimated value $\epsilon_i$ is kept at a predetermined value, and is gradually smaller as the window approaches the guard interval by sliding. Then, the estimated value $\epsilon_i$ will be converged into zero when the window and the guard interval are the same. Thus, the symbol starting point can be determined by comparing the estimated value with a threshold value, which is performed by the controller 570.

2. Coarse frequency synchronization algorithm (CFREQ)

It is generally known that it is possible to trace fine frequency sync within the range of a distance between subcarriers ±½, which, however, cannot be assured actually due to interference between carriers. Thus, a frequency sync must be traced by performing the coarse frequency synchronization to a narrower range than the above-described range.

In the coarse frequency synchronization, a frequency offset is not directly obtained but a shaping wave corresponding to the frequency offset affecting sample data of a time domain, and a signal rotated by the shaping wave is FFT-processed to convert the same into a frequency domain signal. This is for selecting the position of a reference carrier for eliminating a coarse frequency offset from the FFT-processed sample data.

As the reference carrier, a continual pilot carrier (CPC) is used in the OFDM frame frequency domain. The CPC is a BPSK-modulated reference signal present at a fixed position of the OFDM symbol and has a higher power than a data signal having actual information.

Therefore, the CPC reference carriers present at the same position of neighboring two symbols are differentiated and decoded, and correlation between the two symbols by a frequency offset can be expressed quantitatively as the following equation (2).

$$\varepsilon = \left| \sum_{j=0}^{L-1} \mathrm{Re}(C_{2n+1,p(j)} \cdot C^*_{2n,p(j)}) \right| + \left| \sum_{j=0}^{L-1} \mathrm{Im}(C_{2n+1,p(j)} \cdot C^*_{2n,p(j)}) \right| \quad \text{Equation (2)}$$

where a variable $C_{u,v}$ is the complex number of the corresponding sample of the u-th symbol of the v-th carrier, L is the total number of reference carriers in a single symbol, p(j) is the position of the j-th reference carrier in a frame, Re(.) and Im(.) are a real- number part and an imaginary-number part, respectively, and the asterisk [*] implies a conjugate complex number. In other words, the estimated value is obtained by adding absolute values of the differentiated and decoded values of CPC carriers being at the same position, of two continual symbols.

When the shaping wave generated from the rotator 510 is {-S, S} (S is an integer.), (2S+1) candidate offset values obtained by the above equation (2) are {$\varepsilon_{-s}, \varepsilon_s$}, and the respective candidate offset values are sequentially calculated one by one for every unit clock.

Finally, among the candidate offset values, the first and second peak values are detected to obtain the optimal coarse frequency sync according to the positions of the two peak values.

Figure 4:
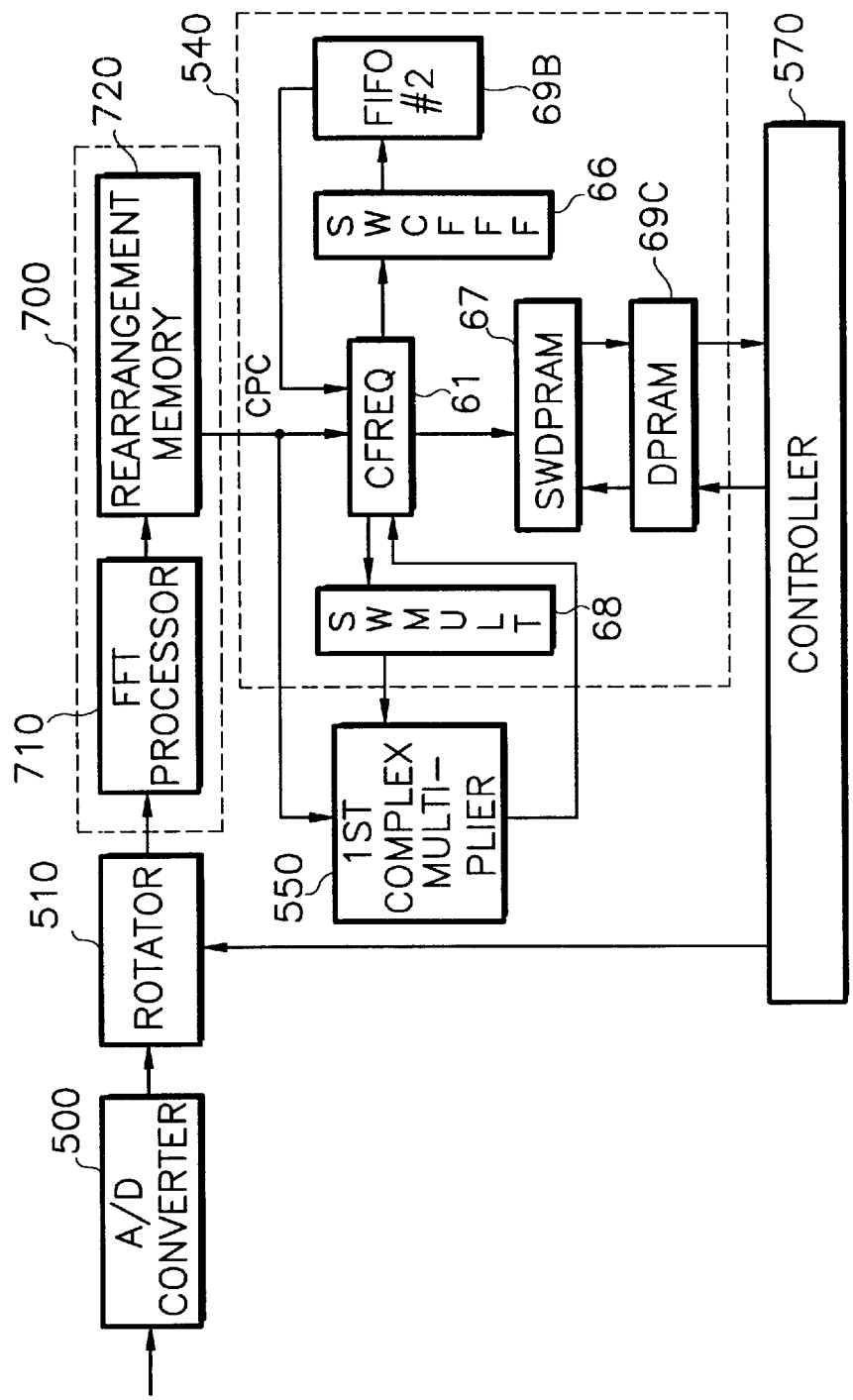
FIG. 4 illustrates input/output data flow among blocks for performing coarse frequency synchronization in the synchronizing section shown in FIG. 2.

FIG. 4 illustrates input/output data flow among blocks for performing coarse frequency synchronization in the synchronizing section 540 shown in FIG. 2, in which reference numerals of some functional blocks are the same as those in FIG. 2. The CFREQ 61 is implemented by the above equation (2).

A received signal is applied to the shaping wave given through the rotator 510, that is, a predetermined frequency offset, and then FFT-processed by the pilot signal decoding section 700 to then be stored in the rearrangement memory 720. The CFREQ 61 receives the current CPC sample from the rearrangement memory 720, stores the same in the second memory (FIFO#2) 69B through the SWCFFF 66, and then receives the previous CPC sample delayed by one symbol from the second memory (FIFO#2) 69B. Also, the CFREQ 61 converts the previous CPC sample into a conjugate complex number and supplies the same to the first complex multiplier 550 through the SWMULT 68. The first complex multiplier 550 multiplies the current CPC sample of the rearrangement memory 720 with the conjugate complex number of the previous CPC sample to then transmit the multiplication result to the CFREQ 61. The CFREQ 61 receives the outputs of the first complex multiplier 550 for a period of one symbol and accumulates real-number parts and imaginary-number parts to obtain the estimated value $\varepsilon_{CFREQ}$ using the above equation (2). The estimated value $\varepsilon_{CFREQ}$ is stored in the third memory (DPRAM) 69C. The controller 570 receives the estimated value from the third memory (DPRAM) 69C and detects peaks of the candidate offset values searched within a given range to determine the optimal frequency offset and to simultaneously feed-back controls the rotator 510.

In detail, the coarse frequency synchronization according to this embodiment comprises two steps: a first peak detecting step of tracing a frequency offset within the range of ±½ of the distance between carriers; and a second peak detecting step of tracing a frequency offset within the finer range in which the distance between carriers is narrower. The optimal frequency offset is calculated according to the positions at which first and second peaks exist. In other words, a frequency synchronization is traced to the range of less than or equal to 1/k (k>2) the bandwidth of the carriers, hereby achieving frequency sync tracing more accurately and efficiently.

3. Frame synchronization algorithm

Frame synchronization is performed using a transmission parameters signaling (TPS) pilot interleaved into a frame. An OFDM frame consists of N symbols $S_o$ through $S_{N-1}$, and each symbol consists of symbol data and various pilot signals. Since T number of TPS pilot signals are present in one symbol at fixed carrier positions, and one OFDM frame consists of N symbols, N-bit TPS pilots arranged in parallel constitute one TPS block. TPS bits of each symbol are coded by differential-binary phase shift keying (D-BPSK). Since the TPS pilots of each symbol have specific information, they are discernible. The TPS pilot for transmitting various kinds of particular parameters, including frame sync words, data modulation modes, layers, an intrinsic code rate, a number of frames and the like. Particularly, since the frame sync words consist of completely inverted bits between continual frames, frame synchronization can be performed using the frame sync words.

The frame synchronization comprises three steps. That is to say, in a first step, (T+1) number of TPS pilot blocks are read out and a phase difference between 0-th pilot block and the T-th pilot block is obtained to perform D-BPSK. In a second step, T number of TPS bits demodulated in the first step is compared for a period of one symbol to check whether they are equal. In a third step, while performing the second step for a period of (N+1) symbols (frame+1 symbol), the frame sync words are searched. In other words, if the TPS bits demodulated in the second step are not equal to one another, the routine restarts from the first step to trace frame sync word from a new TPS pilot block.

Figure 5:
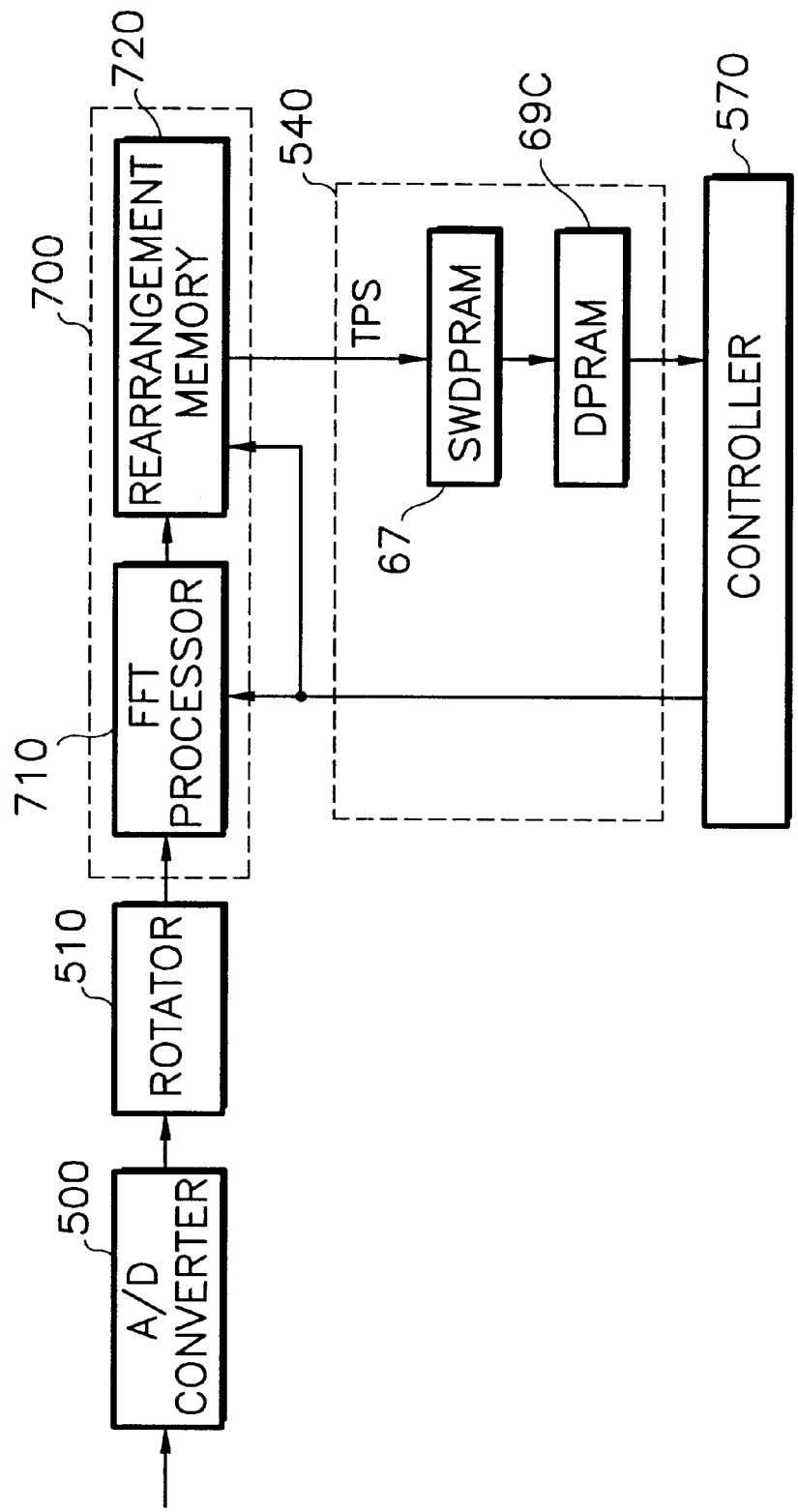
FIG. 5 illustrates input/output data flow among blocks for performing frame synchronization in the synchronizing section shown in FIG. 2.

FIG. 5 illustrates input/output data flow among blocks for performing frame synchronization in the synchronizing section 540 shown in FIG. 2, in which reference numerals of some functional blocks are the same as those in FIG. 2.

Frame synchronization is performed after the coarse time synchronization and the coarse frequency synchronization are performed. The frame synchronization is processed by the controller 570 according to the characteristics of the above TPS pilots.

A received signal is FFT-processed by the FFT processor 710 to then be stored in the rearrangement memory 720. In order to perform frame synchronization, the corresponding samples are output from the rearrangement memory 720 according to a predetermined output rule depending on positions of the TPS pilots and the output samples are stored in the third memory (DPRAM) 69C via the SWDPRAM 67 of the synchronizing section 540. The controller 570 receives the sample delayed by a predetermined period and output from the third memory (DPRAM) 69C and performs a frame sync acquisition algorithm using the characteristics of the frame sync words.

A timing error present in a time domain signal is FFT-processed to be marked by frequency shift. Thus, if a D-BPSK modulated TPS pilot signal is demodulated, the timing error can be eliminated. A frame sync can be acquired effectively by using the TPS frame sync words inverted for each frame.

4. Fine frequency synchronization algorithm

The principle of fine frequency synchronization lies in estimation of the degree of global phase shift between two continual OFDM symbols. The fine frequency synchronization is performed in a similar manner as the coarse frequency synchronization using the CPCs present at the same fixed positions of the symbols. However, while the coarse frequency synchronization employs the magnitude data of the differentiated and decoded values of the CPCs, the fine frequency synchronization employs phase data thereof.

The estimated value $\epsilon_{FFREQ}$ (=$\epsilon$) is expressed as the following equation (3).

$$\varepsilon = \sum_{j=0}^{L-1} \text{Arg}(C_{n+1,p(j)} \cdot C^*_{n,p(j)}) \quad \text{Equation (3)}$$

where a variable $C_{n,p(j)}$ is the complex number of the corresponding sample of the p(j)-th symbol of the n-th carrier, p(j) is the position of the j-th reference carrier (CPC) in a frame, L is the total number of reference carriers in a single symbol, Arg(X) is a phase factor of a differentiated and decoded value X, and the asterisk [*] implies a conjugate complex number.

The fine frequency synchronization is performed in a substantially similar manner as the coarse frequency synchronization and the detailed explanation thereof will be omitted. However, for finer estimation, the phase factors stored in a look-up table are integrated to obtain an estimated value and the bit width of the estimated value is increased. Also, the estimated value is loop-filtered to be used in adjusting the rotator 510.

Figure 6:
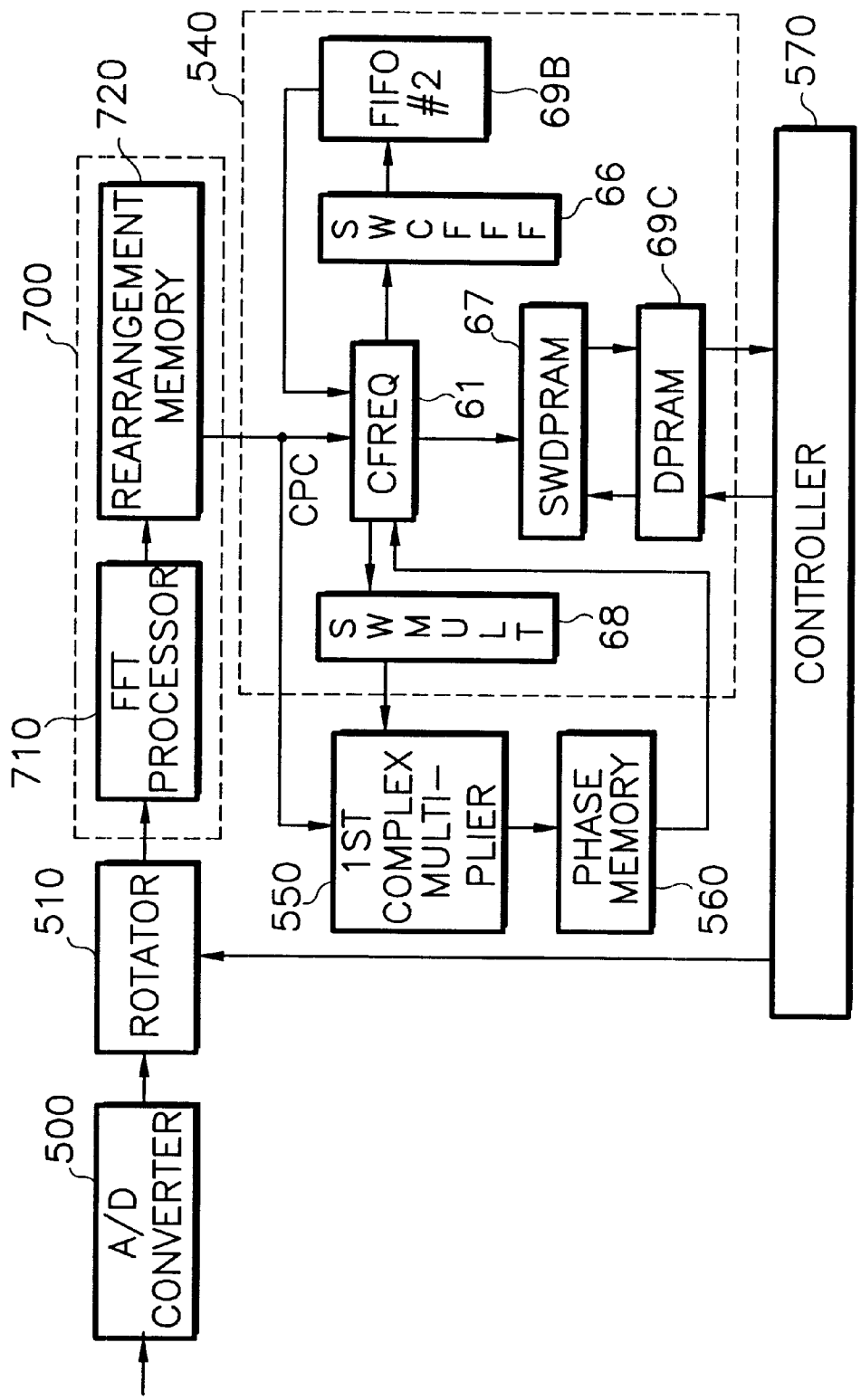
FIG. 6 illustrates input/output data flow among blocks for performing fine frequency synchronization in the synchronizing section shown in FIG. 2.

FIG. 6 illustrates input/output data flow among blocks for performing fine frequency synchronization in the synchronizing section 540 shown in FIG. 2, in which reference numerals of some functional blocks are the same as those in FIG. 2.

A received signal is converted by an initial rotation factor via the A/D converter 500 and the rotator 510 and then FFT-processed by the pilot signal decoding section 700 to then be stored in the rearrangement memory 720. The FFREQ 62 receives the current CPC sample from the rearrangement memory 720, stores the same in the second memory (FIFO#2) 69B through the SWCFFF 66, and then receives the previous CPC sample delayed by one symbol from the second memory (FIFO#2) 69B. Also, the FFREQ 62 converts the previous CPC sample into a conjugate complex number and supplies the same to the first complex multiplier 550 through the SWMULT 68. The first complex multiplier 550 multiplies the current CPC sample of the rearrangement memory 720 with the conjugate complex number of the previous CPC sample to then transmit the multiplication result, that is, the differentiated and decoded value, to the phase memory 560. The phase memory 560 outputs a phase value corresponding to the input applied thereto and supplies the same to the FFREQ 62. The FFREQ 62 receives outputs of the phase memory 560 and integrates the same to obtain the estimated value $\epsilon_{FFREQ}$ using the above equation;(3). The estimated value $\epsilon_{FFREQ}$ is stored in the third memory (DPRAM) 69C. The controller 570 receives the estimated values from the third memory (DPRAM) 69C and loop-filters the same to obtain a mean value. Also, the controller 570 readjusts the rotation factor of the rotator 510 to perform a feed-back control of the rotator 510.

5. Fine time synchronization algorithm

In fine time synchronization, in order to estimate and restore the phase deviated by distortion of a channel and the front stage of a receiver, a scattered pilot cell (SPC) signal which is one of the pilot signals is used as a reference carrier.

The estimation in the fine time synchronization is made on the amount of phase rotation between two continual SPCs using the following equation (4), in consideration of the correlation between a SPC and a reference value of the SPC and correlation between a next SPC and a reference value of the next SPC:

$$\varepsilon = \sum_{j}^{L-1} \text{Arg}[(C_{n,p(j)} C^*_{n,p(j+1)})(R^*_{n,p(j)} R_{n,p(j+1)})] \quad \text{Equation (4)}$$

$$= \sum_{j}^{L-1} [\text{Arg}(C_{n,p(j)} R^*_{n,p(j)}) - \text{Arg}(C^*_{n,p(j+1)} R_{n,p(j+1)})]$$

$$= \sum_{j=0}^{L-1} [\varphi_j - \varphi_{j+1}]$$

where $C_{n,p(j)}$ is the complex number of the p(j)-th reference carrier (SPC) of the n-th OFDM symbol, $R_{n,p(j)}$ is the reference value of the p(j)-th reference carrier (SPC) of the n-th OFDM symbol and takes 1 or −1, L is the total number of reference carriers (SPCs) in a single symbol, p(j) is the position of the j-th reference carrier (SPC) in a frame, $\phi_j$ equals to arg ($C_{n,p(j)}$, $R^*_{n,p(j)}$) and the asterisk [*] implies a conjugate complex number. Thus, the estimated value of the fine time synchronization can be obtained by integrating the phase difference between the two continual SPC signals in accordance with the total number of the reference signals in one symbol using the above equation (4).

Figure 7:
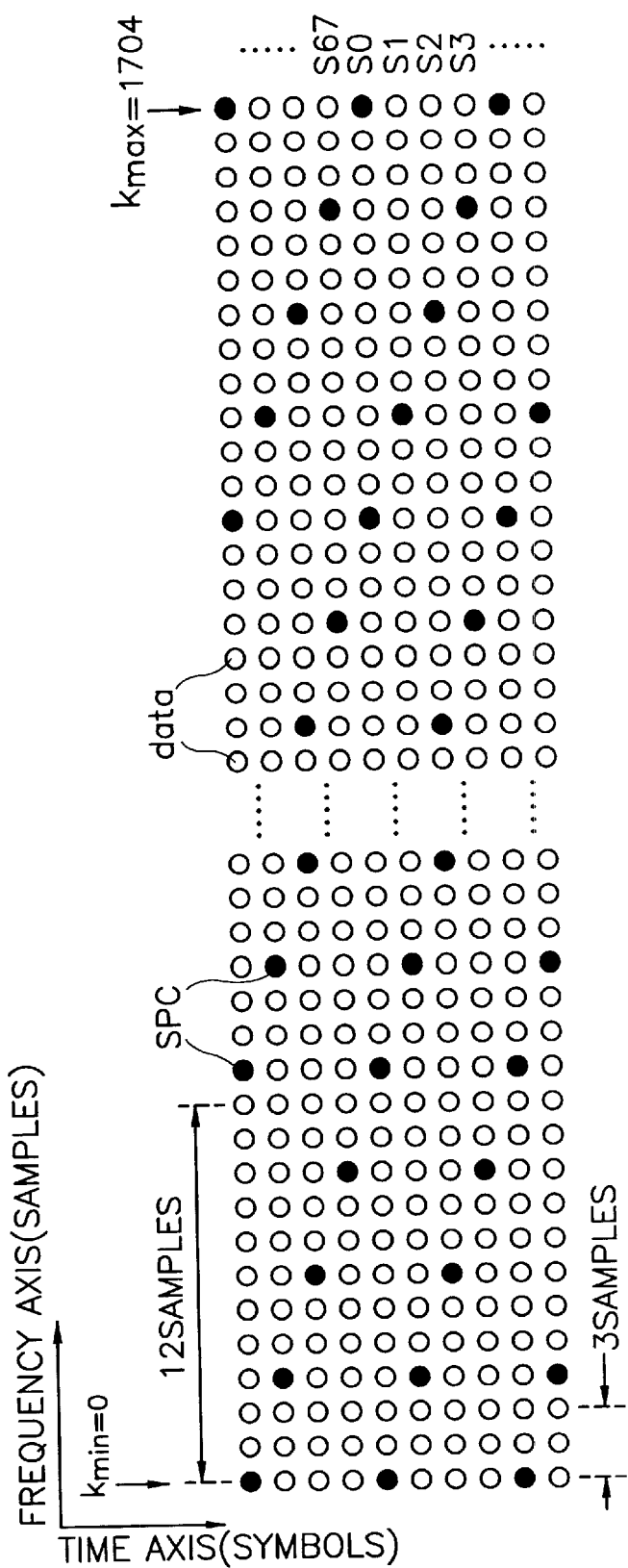
FIG. 7 illustrates the scattered pilot cell (SPC) position in an OFDM frame structure.

Now, the SPC positions in the OFDM frame structure will be described with reference to FIG. 7, in which an OFDM frame consists of 68 OFDM symbols $S_0$ through $S_{67}$, each symbol consists of 6817 or 1705 subcarriers in the case of a 8K or 2K mode, where K is the number of subcarriers, data represents useful data having actual information, and SPC represents a boosted scattered pilot cell. The SPC in one symbol is repeated for every 12 samples, and the SPC of one symbol and that of a neighboring symbol are distributed to have a difference corresponding to 3 samples. Also, modular 4 operation is performed according to the order of symbols, and an SPC is distributed for every last sample Kmax of a symbol whose Modular-4-operated value becomes zero, that is, the fourth symbol ($S_{64}$, $S_0$, $S_4$, etc.).

Figure 8:
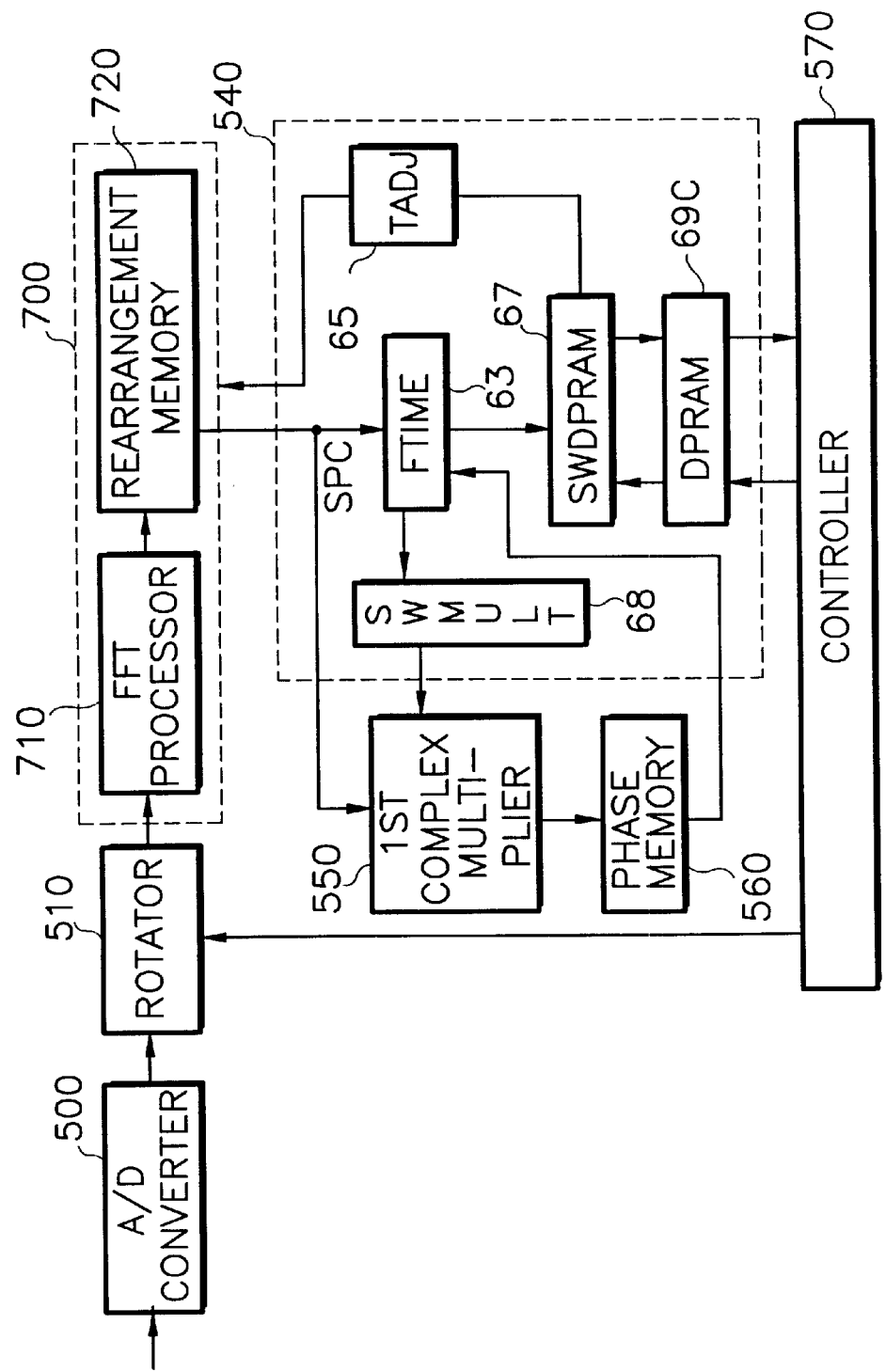
FIG. 8 illustrates input/output data flow among blocks for performing fine time synchronization in the synchronizing section shown in FIG. 2.

FIG. 8 illustrates input/output data flow among blocks for performing fine time synchronization in the synchronizing section 540 shown in FIG. 2.

A received signal is FFT-processed by the pilot signal decoding section 700 via the A/D converter 500 to then be stored in the rearrangement memory 720. The FTIME 63 receives the j-th SPC sample from the rearrangement memory 720, supplies the same to the first complex multiplier 550 through the SWMULT 68. Also, the FTIME 63 converts the (j+1)-th SPC sample into a conjugate complex number and supplies the same to the first complex multiplier 550 through the SWMULT 68. The first complex multiplier 550 multiplies the conjugate complex number of the j-th SPC sample with the conjugate complex number of the (j+1)-th SPC sample to then transmit the multiplication result to the phase memory 560. The phase memory 560 outputs a phase value corresponding to the input applied thereto and supplies the same to the FTIME 63. The FTIME 63 receives outputs of the phase memory 560 and integrates the same to obtain the estimated value $\epsilon_{FTIME}$ using the above equation (4). The estimated value $\epsilon_{FTIME}$ is stored in the third memory (DPRAM) 69C through the SWDPRAM 67. The controller 570 converts appropriately the estimated values supplied from the third memory (DPRAM) 69C and supplies the converted values to the TADJ 65 and feed-back controls the gain of the A/D converter 500.

The estimated value of the FTIME 63 is not directly supplied to the TADJ 65 but is supplied through the controller 570, for the purpose of reducing additional burden of hardware. In other words, the estimated values stored in the phase memory 560 are all used for obtaining CTIME, FTIME, PNOISE and FFREQ. Particularly, the estimated value for the FTIME must be an integer multiple and thus is adjusted to correspond to the sample index by the controller 570.

If a received signal sample Cn,p(j) is FFT-processed by the pilot signal decoding section 700, '0' and '1' are referred to as the SPC signals among the received signal samples, which are then BPSK-coded so that '0'becomes '−j−0' and '1' becomes '+j0'. Thus, the reference values are decoded by 0 and 1 among the FFT-processed signals so that $R_{n,p(j)}$ equals to '−1' and $R^*_{n,p(j)}$ equals to '1', respectively. Also, the output of the phase memory 560 for calculating the phase value, i.e., $R^*_{n,p(j)} R_{n,p(j+)}$, is '1' or '−1', the output of the phase memory 560 is inverted or output without being inverted.

The estimated value converted in the controller 570 is stored in the third memory (DPRAM) 69C to then be supplied to the TADJ 65 through the SWDPRAM 67. Then, the TADJ 65 notifies the pilot signal decoding section 700 of the timing for the fine time synchronization.

Here, the absolute values of the phase rotation between two continual reference SPC samples in the above equation (4) must be adjusted to be less than or equal to $\pi$, for achieving effective estimation. Under such a limitation, in this embodiment, the offset corresponding to $N_u 24$ can be managed. Eventually, the fine time synchronization will be achieved within the range corresponding to the distance between the starting point of the symbol and the 85-th sample in the case of a 2K mode, and within the range corresponding to the distance between the starting point of the symbol and the 340-th sample in the case of a 8K mode.

6. Phase error value for phase synchronization algorithm

Global phase noise estimation is performed by comparing the absolute phases of samples received at reference sub-carrier (SPC sample) positions. The reference value of the SPC sample is known to a receiver side, a mean value is obtained throughout the positions of the entire reference carriers, and the reference value and the mean value are compared.

The phase noise estimation is done using the following equation (5):

$$\varepsilon = \sum_{j=0}^{L-1} \text{Arg}(C_{n,p(j)} R^*_{n,p(j)}) \qquad \text{Equation (5)}$$

where the variables used are the same as those in the above equation (4).

A phase noise is resynthesized using the output value of the FFREQ 62.

When a variable ($\phi_0$ is defined as the initial phase transmitted, not supplied from the FFREQ 62, and $\phi_j$ is defined as the initial phase supplied from the FFREQ 62, the above equation (5) can be rewritten as the following equation (6).

$$\varepsilon = \sum_{k=0}^{L-1} A_n \qquad \text{Equation (6)}$$

with $A_0 = \phi_0$ and $A_n = \phi_n - A_{n-1}$ (for $1 \leq n \leq L-1$).

In the above equation (6), L is the total number of the reference carriers in a symbol, i.e., SPC samples.

The phase noise estimated using the above equation (6) is supplied to the FTIME 63 to be used in correcting the phase noise.

Figure 9:
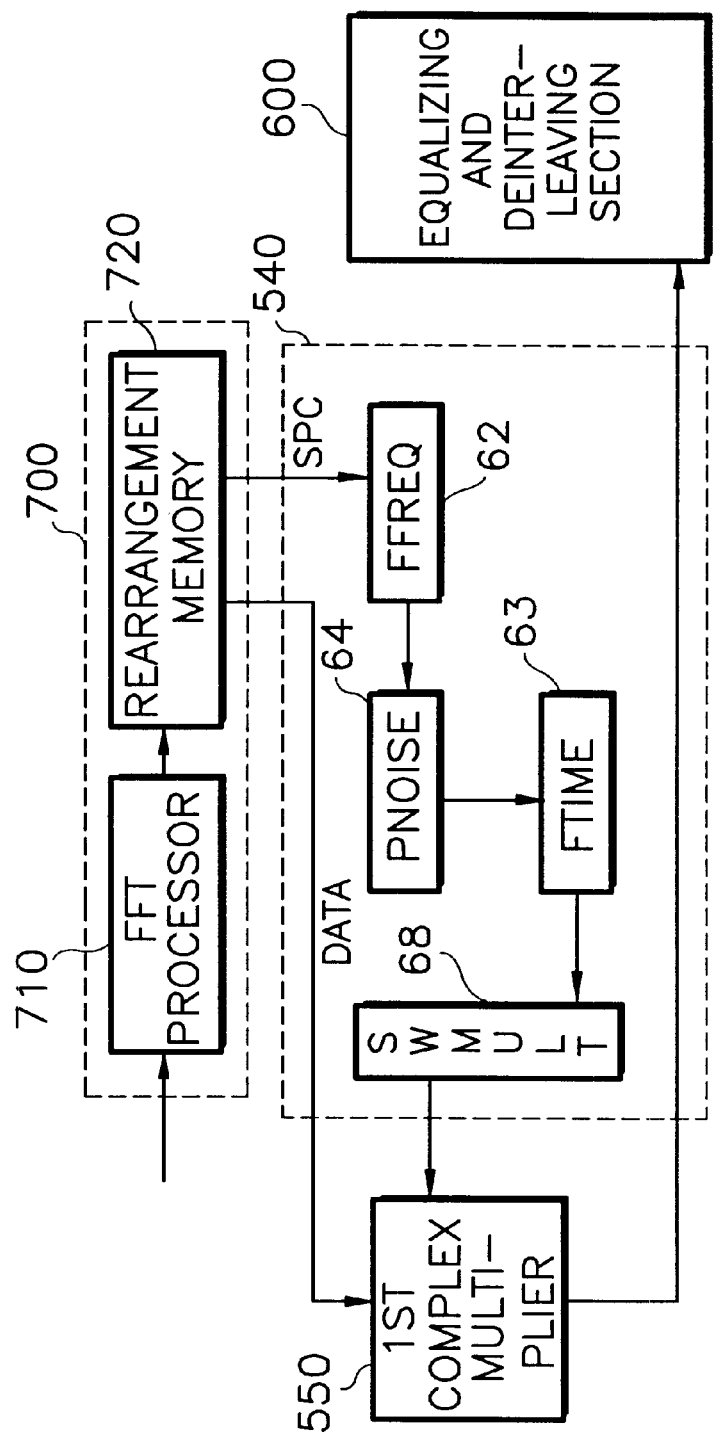
FIG. 9 illustrates input/output data flow among blocks for performing phase noise estimation in the synchronizing section shown in FIG. 2.

Referring to FIG. 9, among the FFT-processed signals stored in the rearrangement memory 720, the SPC sample is supplied to the FFREQ 62. The FFREQ 62 multiplies the SPC sample with the conjugate complex number of the reference value of the SPC sample using the above equation (5) to then output the phase noise for each reference carrier. The PNOISE 64 receives the outputs of the FFREQ 62 and estimates phase noises present throughout one symbol using the above equation (6). The phase noise estimated by the PNOISE 64 is converted for correcting the phase noise of actual data to then be supplied to the first complex multiplier 550 through the SWMULT 68. The first complex multiplier 550 receives the data sample stored in the rearrangement memory 720 and multiplies the same with the conjugate complex number of the estimated phase noise to then transmit the phase-noise removed data sample to the equalizing and deinterleaving section (FPGA #2) 600.

Now, a method for extracting a pilot signal necessary in each synchronization step by rearranging the data FFT-processed by the pilot signal decoding section 700, which is the essential feature of the present invention, and hardware for implementing the method will be described with reference to FIGS. 10 and 11.

The pilot signal decoding section 700 includes a FFT processor 800 for FFT-processing a received signal, a rearrangement table 820 in which the order for storing pilot signals and data separately is stored, and a dual-port RAM 830 in which pilot signals and data are separately stored among the FFT-processed signals. A latch 810 and a buffer 840 are further provided at an input port of the dual-port RAM 830 and an output port thereof, for adjusting input/output timings, respectively. Also, there is provided a rearrangement controller 850 for supplying input/output timings and, input/output memory addresses to control the latch 810, the dual-port RAM 830 and the buffer 840.

FIGS. 11A to 11E are diagrams showing the spectrum of data, in which a pilot signal and a data signal are rearranged by the pilot signal decoding section shown in FIG. 10, illustrating the procedure that one symbol is processed in a 2K mode, on the assumption that input data is bit-reversed after being FFT-processed.

Figure 11A:
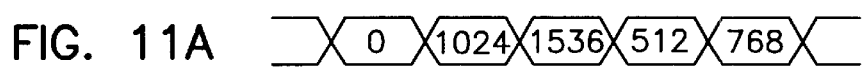
FIG. 11 is a diagram showing the spectrum of data, in which a pilot signal and a data signal are rearranged by the pilot signal decoding section shown in FIG. 10.
Figure 11B:
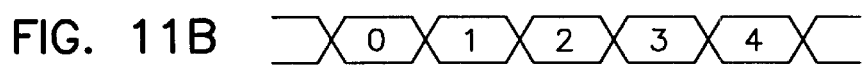
Figure 11C:
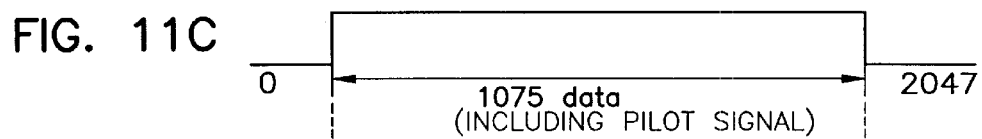

FIG. 11A shows a sample stream of an output signal of the FFT processor 800, sequenced in the order of $S_0$, $S_{1024}$, $S_{1536}$, $S_{512}$ and $S_{768}$. FIG. 11B shows a sample stream of a signal bit-reversed delayed by one symbol from the signal shown in FIG. 13A, sequenced in the order of $S_0$, $S_1$, $S_2$, $S_3$ and $S_4$. FIG. 11C is a diagram showing the spectrum corresponding to that shown in FIG. 11B, in which 1705 useful data samples including a pilot signal are interleaved among 0–2047 carriers of one symbol. As shown in FIG. 11C, after being FFT-processed, since pilot signals and useful data are mixed, it is difficult to locate the position of a specific pilot signal to be used. Thus, if the pilot signals are collected at one place for later use, the pilot signals can be effectively used at any block necessitating the pilot signals.

Figure 11D:
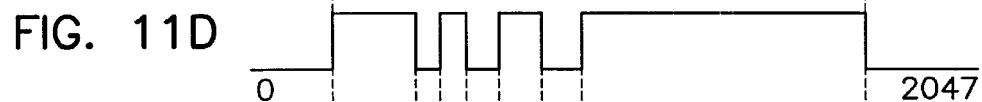
Figure 11E:
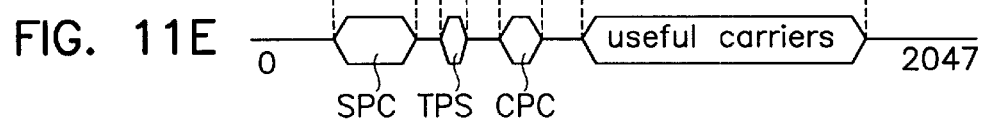

As described above, as shown in FIGS. 11D and 11E which are spectrums acquired by rearrangement, the sample data are sequentially stored in the order of SPC, TPS, CPC and useful carriers. Thus, as shown in FIG. 11D, the order of the pilot signals, prescribed by the DVB specification, can be easily extracted by means of the pilot signal decoding section 700 using a counter and a ROM, in each sync block.

Next, equalization according to an embodiment of the present invention will be described.

7. Equalization algorithm

Equalization algorithm consists of two steps. That is to say, first, interpolation is performed in a time-axis direction based on the reference carrier (SPC sample) and then interpolation is performed again on the result of the time-axis directional interpolation, in a frequency-axis direction. Using the interpolated samples, distorted input signals are equalized.

First, variables used in this embodiment will be defined as follows:

$X_{n,k}$ represents FFT-processed output samples for the k-th carrier of the n-th symbol having channel distortion;

$H_{n,k}$ represents channel transmission function samples for the k-th carrier of the n-th symbol;

$H'_{n,k}$ represents estimated channel transmission function samples for the k-th carrier of the n-th, which are acquired after performing time-axis interpolation and frequency-axis interpolation;

$R_{n,k}$ represents reference values of the SPCs present at positions of the k-th carrier of the n-th symbol, being either '1' or '−1';

$R'_{n,k}$ represents samples received SPC positions;, rhn,k represents "raw" transmission functions of SPC positions, in which $rh_{n,k}=R'_{n,k}/R_{n,k}$;

$I_{n,k}$ represents samples acquired after performing time-axis interpolation by $rh_{n,k}$;

$H'_{n,k}$ represents samples acquired after performing frequency-axis interpolation by $I_{n,k}$; and $Y_{n,k}$ represents channel-equalized samples for the k-th carrier of the n-th symbol.

Figure 12:
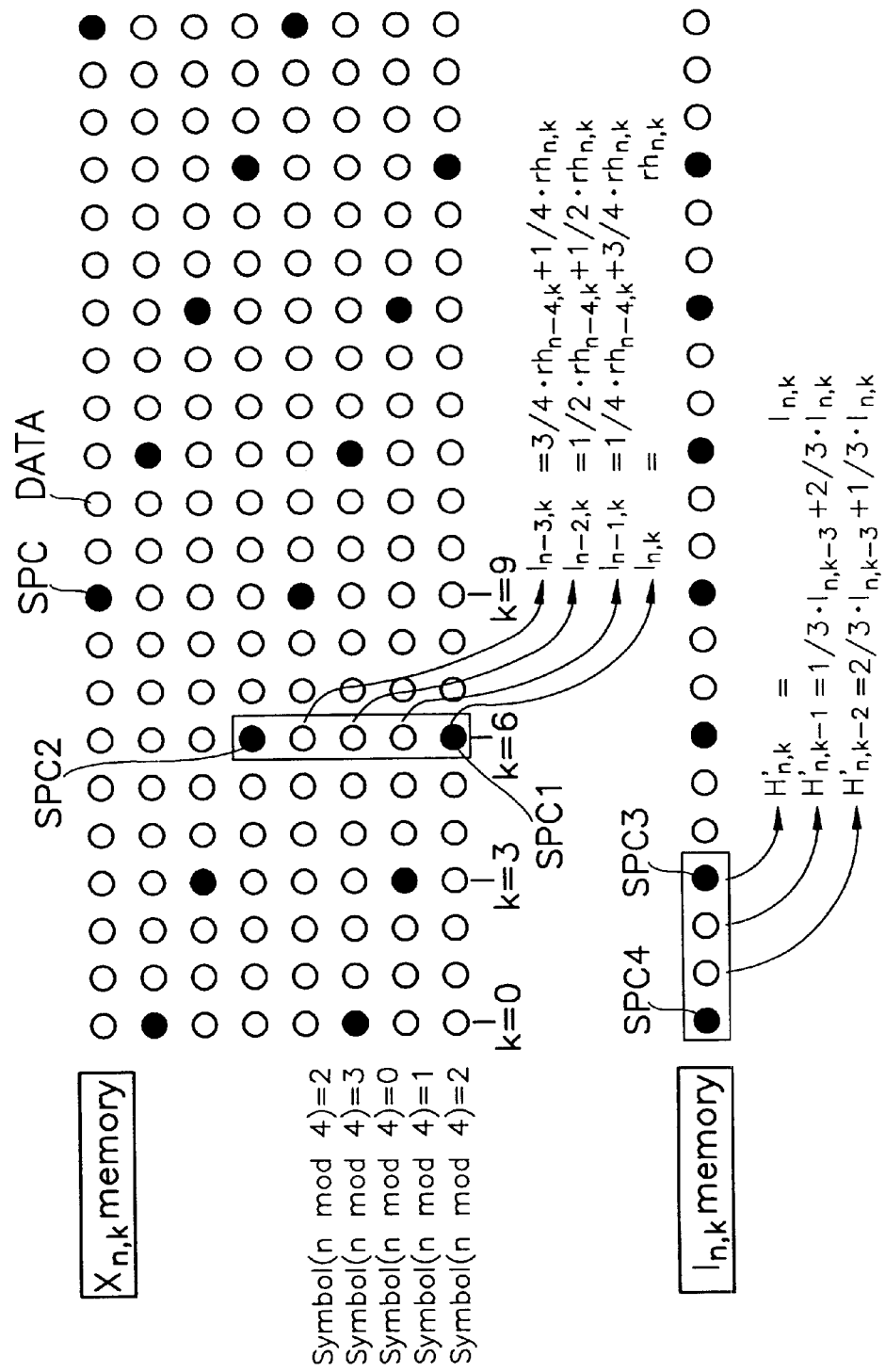
FIG. 12 is a diagram showing the structure of a frame for explaining time-axis interpolation and frequency-axis interpolation employed in an equalization algorithm according to the present invention.

FIG. 12 is a diagram showing the structure of a frame for explaining time-axis interpolation and frequency-axis interpolation employed in an equalization algorithm according to the present invention. The positions of the SPC samples used as the reference carriers for equalization are the same as described in FIG. 7.

Referring to FIG. 12, the time-axis interpolation is performed based on SPCs present at the same carrier positions, with a period of every four symbols. In a memory in which received samples $X_{n,k}$ having channel distortion are stored, the SPCs interleaved at carrier positions where k=0, k=3, k=6, k=9, . . . are extracted and three samples present at the same carrier positions in a time-axis direction are interpolated. For example, when k=6, three samples present between SPC1 and SPC2 are interpolated by a transmission function $rh_{n,k}$ of the SPC1 and the SPC2. A formula for the interpolation is determined by the following equation (7) according to the symbol index corresponding to the case when the received symbol $X_{n,k}$ is the SPC.

Equation (7)

$I_{n,k}=rh_{n,k}$ for symbol (n mod 4)=2

$I_{n-1,k}=\frac{1}{4}rh_{n-4,k}+\frac{3}{4}rh_{n,k}$ for symbol (n mod 4)=1

$I_{n-2,k}=\frac{2}{4}rh_{n-4,k}+\frac{2}{4}rh_{n,k}$ for symbol (n mod 4)=0

$I_{n-3,k}=\frac{3}{4}rh_{n-4,k}+\frac{1}{4}rh_{n,k}$ for symbol (n mod 4)=3

Where the interpolants for three data samples are obtained by a component ratio of the interpolant $I_{n,k}$ (=$rh_{n,k}$) of the SPC1 to the interpolant $I_{n-4,k}$ (=$rh_{n-4,k}$) of the SPC2. In other words, the interpolant suitable for the corresponding condition is selected among ones represented by the above equation (7) according to values of 0, 1, 2 and 3, obtained by modular-4 calculating the symbol index n.

The frequency-axis interpolation is performed based on SPCs present at the same carrier positions, with a period of every three samples. Also, the interpolant obtained by performing the frequency-axis interpolation using the time-axis interpolant $I_{n,k}$ acquired after performing the time-axis interpolation corresponds to the channel transmission function estimated for each sample.

In a memory in which time-axis interpolants $I_{n,k}$ are stored, the reference SPC interpolants present at carrier positions where k=0, k=3, k=6, k=9, . . . are extracted and two samples present in the frequency-axis direction are interpolated. For example, two samples present between SPC3 and SPC4 are interpolated by the time-axis interpolant $I_{n,k}$ of the SPC3 and the time-axis interpolant $I_{n,k-3}$ of the SPC 4. A formula for the interpolation is determined by the following equation (8) according to the symbol index.

Equation (8)

$H'_{n,k}=I_{n,k}$ for carrier (k mod 3)=0

$H'_{n,k-1}=\frac{1}{3}I_{n,k-3}+\frac{2}{3}I_{n,k}$ for carrier (k mod 3)=1

$H'_{n,k-2}=\frac{2}{3}I_{n,k-3}+\frac{1}{3}I_{n,k}$ for carrier (k mod 3)=2 where the interpolants for two data samples are obtained by a component ratio of the interpolant $H'_{n,k}(=I_{n,k})$ of the SPC1 to the interpolant $H'_{n,k-3}$ (=$I_{n,k-3}$) of the SPC2. In other words, the interpolant suitable for the corresponding condition is selected among ones represented by the above equation (8) according to values of 0, 1 and 2, obtained by modular-3-calculating the carrier index k. The frequency-axis interpolants ($H'_{n,k-1}$, $H'_{n,k-2}$) for two data samples are calculated with a more weight given to the reference SPC closer to themselves, and the calculated values correspond to the estimated channel transmission functions.

As described above, according to the equalization algorithm, the time-axis interpolants $I_{n,k}$ are obtained by the received SPC and the SPC reference values, and the obtained interpolants are subjected to the frequency-axis interpolation by the time-axis interpolants $I_{n,k}$ to obtain the channel transmission function $H'_{n,k}$ estimated for each sample, thereby equalizing a channel-distorted signal, that is, acquiring equalized samples $Y_{n,k}$ (=$X_{n,k}/H'_{n,k}$).

Figure 13:
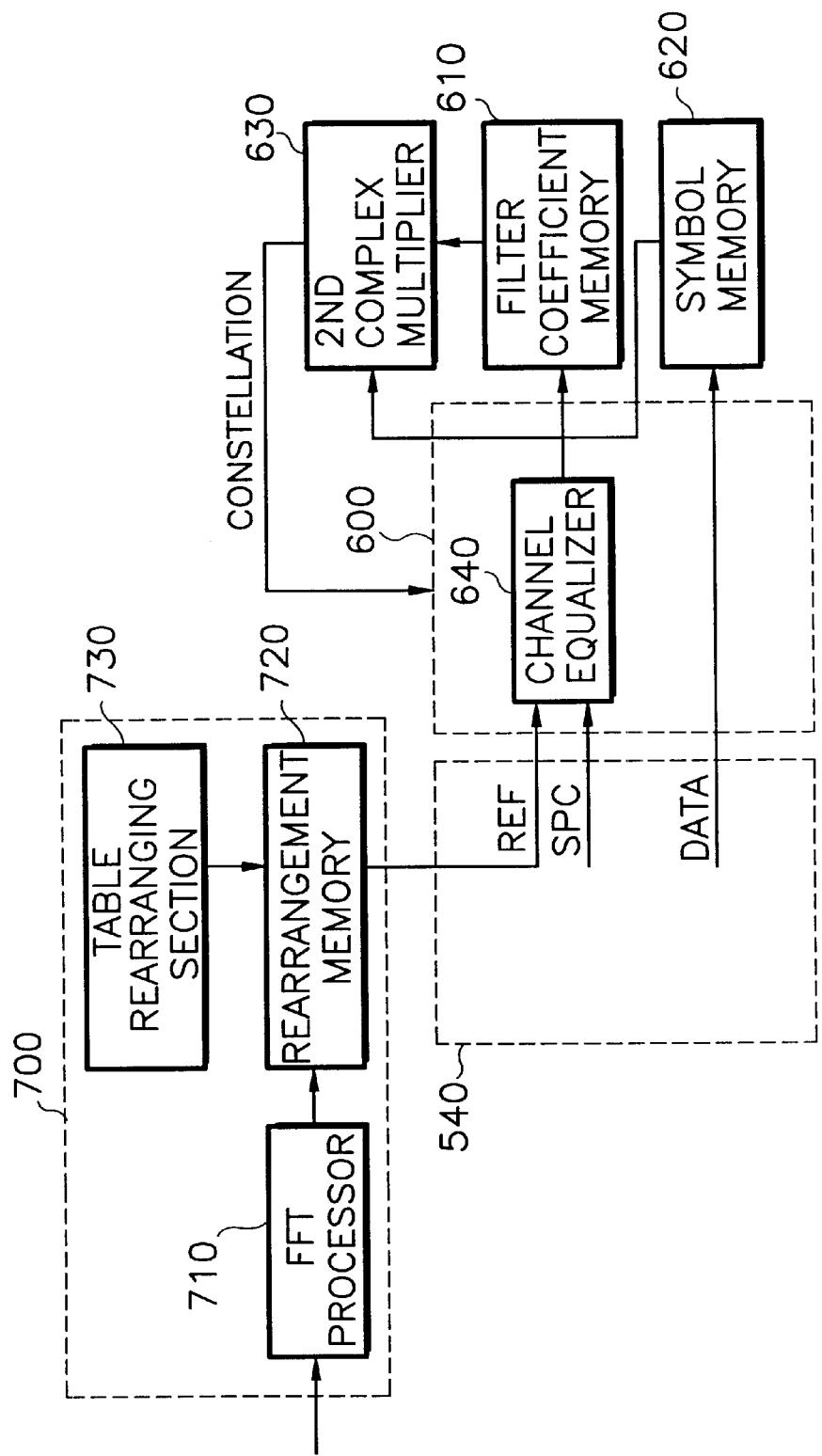
FIG. 13 illustrates input/output data flow among blocks for performing equalization algorithm in the equalizing and deinterleaving section shown in FIG. 1.

FIG. 13 illustrates input/output data flow among blocks for performing equalization algorithm in the equalizing and deinterleaving section 600 shown in FIG. 1.

The received channel-distorted sample data, i.e., DATA, which is the phase-noise eliminated sample, shown in FIG. 12, are stored in the symbol memory 620. The channel equalizer 640 of the equalizing and deinterleaving section 600 implemented by the FPGA #2 receives the received SPC and the SPC reference value (REF) of the corresponding SPC position from the rearrangement memory 720 of the pilot signal decoding section 700, and performs channel equalization in accordance with the suitable conditions defined in the above equation (7) or (8). In other words, an external coefficient memory 610 multiplies the output of the channel equalizer 640 by a multiple of the corresponding coefficient to then supply the multiplication result to the complex multiplier 630. The complex multiplier 630 multiplies the distorted data sample stored in the symbol memory 620 with the complex number of the channel transmission function acquired by the reference SPC of the data symbol to output the equalized data sample.

As described above, after OFDM demodulation is performed on the QAM-OFDM demodulated signal, demapping and deinterleaving are performed on the QAM-modulated signal, thereby obtaining a perfectly restored signal.

According to the present invention, synchronization processing can be easily controlled by a controller. Also, since the operation of various functional blocks are controlled by the controller for each symbol, it is not necessary to manipulate data according to symbol processing rates. Also, since a pilot signal decoding section including a rearrangement memory rearranges pilot signals and data signals separately and simply extracts necessary pilot signals according to synchronization modes, a separate pilot extracting section is not necessary. Various synchronization blocks, and an equalizing and deinterleaving block are implemented by FPGA chips, thereby reducing time for designing, development, implementation and verification, and attaining an optimal logic circuit.

As described above, according to the present invention, the memories necessary for demodulation steps sequentially performed in accordance with the passage of time can be minimized and overlapping resources can be shared, thereby realizing an optimal demodulation system.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. An orthogonal frequency division multiplexing (OFDM) receiver system comprising:
   a receiving section for receiving an OFDM signal, converting the same into a digital signal and compensating for phase error and for frequency error of the digitally converted OFDM signal;
   a pilot signal decoding section for FFT-processing the output of the receiving section, and sequentially storing pilot signals and data separately according to a rearrangement rule;
   a synchronizing section for receiving the output of the pilot signal decoding section, performing coarse time synchronization, coarse frequency synchronization, frame synchronization, fine frequency synchronization and fine time synchronization, estimating a phase noise and correcting the same;
   an equalizing and deinterleaving section for performing a channel equalization algorithm on the output of the pilot signal decoding section using a reference pilot signal of the synchronizing section, restoring the equalized symbol into the original symbol, and rearranging the symbol in the order of the original symbol; and
   a controller for controlling the timing of data rearrangement in the pilot signal decoding section and feed-back controlling the receiving section according to the outputs of the respective synchronization results.

2. The OFDM receiver system according to claim 1 further comprising:
   a first complex multiplier for supporting the respective synchronization processes;
   a phase memory for supplying a phase offset for the output of the first complex multiplier to the synchronizing section;
   a coefficient memory for storing filter coefficients for supporting the channel equalization;
   a symbol memory for storing received data samples supplied from the synchronizing section; and
   a second complex multiplier for complex-multiplying the output of the coefficient memory and the output of the symbol memory and supplying the obtained OFDM demodulated sample to the equalizing and deinterleaving section.

3. The OFDM receiver system according to claim 1, wherein the pilot signal decoding section comprises:
   a fast Fourier transform (FFT) processor for FFT-processing an input signal;
   a rearrangement table in which the order for storing pilot signals and data separately is stored;
   a memory for storing pilot signals and data are separately stored among the FFT-processed signals in accordance with the storage order for the rearrangement table; and
   a rearrangement controller for supplying input/output timings and input/output memory addresses and controlling the memory.

4. The OFDM receiver system according to claim 2, wherein the synchronizing section comprises:
   a coarse time synchronization block for calculating an estimated value for coarse time synchronization;
   a coarse frequency synchronization block for calculating an estimated value for coarse frequency synchronization;
   a fine frequency synchronization block for calculating an estimated value for fine frequency synchronization;
   a fine time synchronization block for calculating an estimated value for fine time synchronization;
   a phase noise estimation block for calculating an estimated value for phase noise estimation and correction;
   a first memory for temporarily storing input/output data of the coarse time synchronization block;
   a second memory for temporarily storing input/output data of the coarse frequency synchronization block and the fine frequency synchronization block;
   a third memory for storing data input/output data of the coarse frequency synchronization block, the fine frequency synchronization block, the fine time synchronization block, the phase noise estimation block and the controller;
   a timing adjusting block for transmitting a control signal indicative of the starting timing of a time domain symbol to the pilot signal decoding section according to signals supplied from the coarse time synchronization block and the fine time synchronization block;
   a first switching block for serving to perform interfacing with the second memory shared by the coarse frequency synchronization block and the fine frequency synchronization block in a time-divisional manner;
   a second switching block for serving interfacing with the third memory shared by the coarse frequency synchronization block, the fine frequency synchronization block, the fine time synchronization block and the phase noise estimation block in a time-divisional manner;
   a third switching block for serving to perform interfacing for allowing the coarse time synchronization block, the coarse frequency synchronization block, the fine frequency synchronization block and the fine time synchronization block to share the first complex multiplier in a time-divisional manner.

5. The OFDM receiver system according to claim 4, wherein the estimated value of the coarse time synchronization is obtained by the first complex multiplier for receiving the signal output from the receiving section through the third switching block, receiving 1+0j from the pilot signal decoding section, and multiplying two complex numbers, the phase memory for receiving the complex multiplication result and generating the corresponding phase function, and the coarse time synchronization block for receiving the phase function of the phase memory and obtaining a difference value between current neighboring samples, and a difference value between the neighboring samples delayed corresponding to the useful samples, subtracting the two difference values within the range of the window size set by the first memory, accumulating the subtraction results and obtaining the sum of the i-th window to obtain the estimated value of the coarse time synchronization.

6. The OFDM receiver system according to claim 5, wherein a signal indicative of the timing for the coarse time synchronization is controlled by the timing adjusting block, and the symbol starting point is determined by the controller by detecting a threshold value.

7. The OFDM receiver system according to claim 4, wherein in obtaining the estimated value of the coarse frequency synchronization using the corresponding CPC sample among signals FFT-processed by the pilot signal decoding section after applying a received signal to a frequency offset set by the receiving section, the synchronizing section for coarse frequency synchronization obtains the estimated value of the coarse frequency synchronization such that the synchronizing section receives the current CPC sample from the rearrangement memory, stores the same in the second memory through the first switching block, receives the previous CPC sample delayed by one symbol from the second memory, receives, for a period of one symbol, the multiplication result on the previous CPC sample converted into the conjugate complex and the complex number of the current CPC sample by means of the first complex multiplier to then accumulate real-number parts and imaginary-number parts.

8. The OFDM receiver system according to claim 7, wherein the estimated value is stored in the third memory through the third switching block, peak values among the stored estimated values are detected by the controller to then determine the optimal frequency offset, and the receiving section is feed-back controlled according to the determined frequency offset.

9. The OFDM receiver system according to claim 8, wherein the peaks are detected by a first peak detecting step of tracing a frequency offset within the range of ±½ of the distance between carriers, and a second peak detecting step of tracing a frequency offset within the finer range in which the distance between carriers is narrower.

10. The OFDM receiver system according to claim 4, wherein the frame synchronization is performed such that TPS samples FFT-processed by the pilot signal decoding section and stored in the rearrangement memory, are read out, the TPS samples are stored in the third memory through the third switching block, the TPS samples delayed by a predetermined period and output from the third memory are supplied to the controller to perform the frame synchronization using TPS frame sync words inverted for each frame.

11. The OFDM receiver system according to claim 4, wherein in obtaining the estimated value of the fine frequency synchronization using the corresponding pilot signals among the signals FFT-processed bu the pilot signal decoding section after a received signal is converted by an initial rotation factor via the receiving section, the fine frequency synchronization is performed such that the fine frequency synchronization block receives the current CPC sample from the rearrangement memory, stores the same in the second memory through the second switching block, receives the previous CPC sample delayed by one symbol from the second memory, converts the previous CPC sample into a conjugate complex number and supplies the same to the first complex multiplier through the third switching block, the first complex multiplier multiplies the current CPC sample with the conjugate complex number of the previous CPC sample to then transmit the multiplication result to the phase memory so that the phase value corresponding to the input applied thereto is supplied to the fine frequency synchronization block, and the fine frequency synchronization block receives outputs of the phase memory and integrates the same to obtain the estimated values.

12. The OFDM receiver system according to claim 11, wherein the estimated values of the fine frequency synchronization are stored in the third memory through the second switching block to then be supplied to the controller and loop-filtered, and the mean value thereof is obtained to readjust the rotation factor of the receiving section, thereby performing feed-back controlling operation.

13. The OFDM receiver system according to claim 4, wherein the fine time synchronization is performed by the fine time synchronizing section using the corresponding SPC samples FFT-processed by the pilot signal decoding section and stored in the rearrangement memory, the fine time synchronizing block converts the (j+1)-th SPC sample into a conjugate complex number and supplies the same to the first complex multiplier through the third switching block, the first complex multiplier multiplies the conjugate complex number of the j-th SPC sample with the conjugate complex number of the (j+1)-th SPC sample to then transmit the multiplication result to the phase memory, the phase memory outputs a phase value corresponding to the input applied thereto and supplies the same to the fine time synchronizing section, and the fine time synchronizing block integrates the phase value output from the phase memory to obtain the estimated value of the fine time synchronization.

14. The OFDM receiver system according to claim 13, wherein the estimated value of the fine time synchronization is stored in the third memory through the second switching block to then be supplied to the controller, and the controller feed-back controls the gains of the time adjusting block and the receiving section.

15. The OFDM receiver system according to claim 4, wherein the phase noise estimation and correction are performed such that among the signals FFT-processed by the pilot signal decoding section, the SPC sample is supplied to the fine frequency synchronization block, the fine frequency synchronization block multiplies the SPC sample with the conjugate complex number of the reference value of the SPC sample to then output the phase noise for each reference carrier, the phase noise estimation block receives the outputs of the fine frequency synchronization block and estimates phase noises present throughout one symbol.

16. The OFDM receiver system according to claim 15, wherein the phase noise estimated by the phase noise estimation block is converted for correcting the phase noise of actual data to then be supplied to the first complex multiplier through the third switching block, the first complex multiplier receives the data sample stored in the pilot signal decoding section and multiplies the same with the conjugate complex number of the estimated phase noise to then transmit the phase-noise removed data sample to the equalizing and deinterleaving section.

17. The OFDM receiver system according to claim 1, wherein the equalization is performed such that received channel-distorted sample data (SPC) are stored in the sym bol memory, the equalizing and deinterleaving section receives the received SPC and the SPC reference value of the corresponding SPC position from the pilot signal decoding section and performs time-axis interpolation and frequency-axis interpolation to obtain a channel transmission function, thereby acquiring equalized data sample.

18. The OFDM receiver system according to claim 1, wherein the controller can be implemented by a DSP chip.

19. The OFDM receiver system according to claim 1, wherein the synchronizing section can be implemented by a FPGA chip.

20. The OFDM receiver system according to claim 1, wherein the equalizing and deinterleaving section can be implemented by a FPGA chip.

* * * * *